United States Patent Office 3,311,649
Patented Mar. 28, 1967

3,311,649
PREPARATION OF DISTANNANES
Kenneth R. Molt, Cincinnati, and Ingenuin Hechenbleikner, Kenwood, Ohio, assignors to Carlisle Chemical Works, Inc., Reading, Ohio, a corporation of Ohio
No Drawing. Filed Nov. 30, 1964, Ser. No. 414,847
12 Claims. (Cl. 260—429.7)

The present invention relates to the preparation of distannanes and also the use of distannanes as pesticides.

It has been proposed in the past to prepare hexaalkyl distannanes by reacting a trialkyltin chloride with sodium in liquid ammonia. Such a process requires the use of pressure equipment.

When oragnic solvents are employed such as naphtha the yield of hexaalkyltin is greatly reduced. Thus only a 56% yield of hexabutyl distannane is obtained when tributyltin chloride (0.5 mole) is reacted with sodium (0.6 mole) in naphtha as a solvent. Additionally there is a considerable amount of by-product bis (tributyltin) oxide formed.

Accordingly, it is an object of the present invention to prepare distannanes in improved yields. Another object is to prepare distannanes under atmospheric pressure.

An additional object is to prepare distannanes with less by-product formation.

A further object is to prepare improved compositions and processes for killing fungi.

Yet another object is to prepare improved compositions and processes for killing bacteria.

A still further object is to prepare improved compositions and processes for killing nematodes.

An additional object is to develop compositions and processes for killing weeds.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that distannanes can be formed by employing a tetraalkyltin or tetraaralkyltin as a solvent for the reaction of sodium with a trihydrocarbontin chloride or a mixture of trihydrocarbontin chlorides according to the equation:

$R_1R_2R_3SnCl + R_4R_5R_6SnCl + 2Na \rightarrow$
$R_1R_2R_3SnSnR_4R_5R_6$
$R_1R_2R_3SnSnR_1R_2R_3$
$R_4R_5R_6SnSnR_4R_5R_6$ $R_1$, $R_2$, $R_3$, $R_4$, $R_5$ and $R_6$ can be the same or different and can be alkyl, aralkyl or carbocyclic aryl. Not over three of $R_1$, $R_2$, $R_3$, $R_4$, $R_5$ and $R_6$ should be aryl. Preferably all of $R_1$, $R_2$, $R_3$, $R_4$, $R_5$ and $R_6$ are alkyl and most preferably all are the same alkyl group so that a single distannane is formed rather than a mixture of distannanes. While equimolar amounts of the trihydrocarbontin chloride and sodium can be employed it has been found desirable to use a slight excess of the sodium, e.g. a 10–30 molar percent excess.

Examples of suitable starting compounds are trimethyltin chloride, triethyltin chloride, tripropyltin chloride, triisopropyltin chloride, tributyltin chloride, triisobutyltin chloride, triamyltin chloride, triisoamyltin chloride, trihexyltin chloride, triheptyltin chloride, trioctyltin chloride, dimethyloctyltin chloride, butyldiamyltin chloride, dimethylphenyltin chloride, tribenzyltin chloride, triisooctyltin chloride, methyl butyl phenyltin chloride, methyl ethyl propyltin chloride, butyl amyl hexyltin chloride, tri 2-ethylhexyltin chloride.

Typical examples of compounds which can be prepared according to the present invention include hexamethyldistannane, hexaethyldistannane, hexapropyldistannane, hexaisopropyldistannane, hexabutyldistannane, hexaisobutyldistannane, hexaamyldistannane, hexaisoamyldistannane, hexahexyldistannane, hexaoctyldistannane, hexabenzyldistannane, bis (dimethylphenyltin), bis (dimethyloctyltin), bis (butyldiamyltin), bis (methyl butyl phenyltin), trimethyl tributyl distannane, triisobutyl tributyl distannane, hexaisooctyl distannane, methyl ethyl propyl butyl amyl hexyl distannane, hexa-2-ethylhexyldistannane.

As the tetraalkyltin or tetraaralkyltin solvent there can be used tetramethyltin, tetraethyltin, tetrapropyltin, tetraisopropyltin, tetrabutyltin, tetraisobutyltin, tetraamyltin, tetraisoamyltin, tetrahexyltin, tetraheptyltin, tetraoctyltin, tetrabenzyltin, dimethyl dioctyltin, tetra-2-ethylhexyltin, dimethyl dibutyltin, dibutyl dioctyltin, tetradecyltin.

The tetraalkyltin or the like is used in an amount sufficient to dissolve the trialkyltin chloride or the like. Normally there is employed at least 0.5 mole of tetraalkyltin per mole of trialkyltin chloride and preferably at least 0.9 mole of the tetraalkyltin per mole of trialkyltin chloride. A large amount of the tetraalkyltin can be used, e.g. 1, 2, 5 or 10 moles per mole of the trialkyltin chloride.

The trialkyltin chloride can be made in known fashion by reacting 3 moles of tetraalkyltin with 1 mole of tin tetrachloride, e.g.

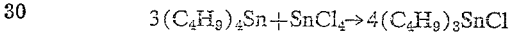

To insure there is no by-product formation such as dibutyltin dichloride preferably 50 to 100% molar excess of the tetraalkyltin is employed. There is no need to separate this excess tetraalkyltin from the trialkyltin chloride but instead it can be used as the solvent or dispersing medium in the present invention.

The reaction between the sodium and the trialkyltin chloride or the like is carried out at atmospheric pressure at a temperature of about 80 to 150° C., preferably about 100° C. With the more volatile tetraalkyltin compounds, e.g. tetramethyltin, the reaction can be carried out under reflux. The yields of the hexaalkyldistannane or the like are excellent, e.g. 90% to quantitative.

In order to make the sodium dispersion, preferably the sodium is mixed with the tetraalkyltin, e.g. tetrabutyltin, and then heated to 100–120° C. in an inert atmosphere to melt the sodium. The mixture of sodium and tetraalkyltin is rapidly agitated and in a matter of 15–20 seconds, the sodium is dispersed into very small particles (1–20 microns in diameter) which do not coalesce when the dispersion is cooled to below the melting point of the sodium.

While the tetraalkyltin preferably has the same alkyl groups as the trialkyltin chloride employed this is not essential. However, if the tetraalkyltin has different alkyl groups than the trialkyltin chloride there will be obtained a product which is a mixture of hexaalkyl distannanes.

Unless otherwise indicated all parts and percentages are by weight.

*Example 1*

0.6 mole (13.8 grams) of sodium was dispersed in 100 grams of tetrabutyltin by the manner set forth above and was then added over a 30 minute period to 0.5 mole (163 grams) of tributyltin chloride in 200 grams of tetrabutyltin. The mixture was held at 100–110° C. for two hours, cooled to 20° C. and washed with 100 grams of water and 20 grams of concentrated nitric acid. The tetrabutyltin was recovered by distillation at reduced pressure. The hexabutyl distannane was recovered as the residue in a yield of 135 grams (93%) and had a boiling point of 170–180° C. at 0.1 mm. Hg.

*Example 2*

The procedure of Example 1 was repeated except that the tributyltin chloride solution in tetrabutyltin was added to the sodium dispersion in tetrabutyltin. The yield of hexabutyldistannane was 95% of theory.

*Example 3*

Tributyltin chloride was prepared by reacting 8 moles of tetrabutyltin with 1 mole of stannic chloride. The product was 4 moles of tributyltin chloride dissolved in 5 moles of tetrabutyltin. To this mixture there was added 4.8 moles of sodium dispersed in 2.3 moles of tetrabutyltin and the mixture was then heated to 100° C. for 2 hours and the tributyltin chloride product recovered in the manner set forth in Example 1.

*Example 4*

The procedure of Example 1 was repeated replacing the tributyltin chloride by 0.5 moles of trioctyltin chloride and replacing the tetrabutyltin added with the sodium by 165 grams of tetraoctyltin and replacing the tetrabutyltin added with tributyltin chloride by 330 grams of tetraoctyltin added with the trioctyltin chloride. The product obtained in good yields as the residue after distilling off the tetraoctyltin was hexaoctyldistannane. In similar fashion there can be prepared hexamethyl distannane by adding sodium dispersed in tetramethyltin to trimethyltin chloride dissolved in tetramethyltin and heating the mixture at reflux.

The compounds prepared in the manner set forth above and in fact hexahydrocarbon distannanes in general are useful as nematocides, fungicides, bactericides and herbicides. Compounds suitable for such purposes have the formula $$R_7R_8R_9SnSnR_{10}R_{11}R_{12}$$

where $R_7$, $R_8$, $R_9$, $R_{10}$, $R_{11}$, and $R_{12}$ can be the same or different and can be alkyl, aralkyl, carbocyclic aryl, cycloalkyl, or alkenyl. As examples of compounds suitable as fungicides, bactericides, nematocides and weedicides there can be used hexamethyl distannane, hexaethyl distannane, hexapropyl distannane, hexabutyl distannane, hexaisopropyl distannane, hexaisobutyl distannane, hexaamyl distannane, hexaisoamyl distannane, hexahexyl distannane, hexaoctyl distannane, hexa-2-ethylhexyl distannane, hexaphenyl distannane, hexacyclohexyl distannane, hexaallyl distannane, hexacrotyl distannane, hexavinyl distannane, hexa-p-tolyl distannane, hexabenzyl distannane, bis (dimethylphenyltin, bis (dimethyloctyltin), bis (butyldiamyltin), bis (methyl butyl phenyltin), trimethyl tributyl distannane, triisobutyl tributyl distannane, hexaisooctyl distannane, methyl ethyl propyl butyl amyl hexyl distannane.

The preferred compounds as pesticides are the hexa lower alkyl distannanes.

The compounds of the present invention can be used alone as nematocides, fungicides, herbicides, bactericides, but it has been found desirable to apply them to the pest, e.g., to the soil habitat of nematodes, together with inert solids to form dusts or, more preferably, suspended in a suitable liquid diluent, preferably water. There can also be added surface active agents or wetting agents and inert solids in such liquid formulation. Desirably, 0.25–1% by weight of surface active or wetting agent is employed. The active ingredient can be from 0.01 to 95% by weight of the entire composition in such case.

In place of water there can be employed organic solvents as carriers, e.g., hydrocarbons such as benzene, toluene, xylene, kerosene, diesel oil, fuel oil, and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate and butyl acetate, ethers, e.g., ethylene glycol monomethyl ether and diethylene glycol monomethyl ether, alcohols, e.g., ethanol, methanol, isopropanol, amyl alcohol, ethylene glycol, propylene glycol, and glycerine. Mixtures of water and organic solvents, either as solutions or emulsions, can be employed.

The novel pesticides can also be applied as aerosols, e.g., by dispersing them in air by means of a compressed gas such as dichlorodifluoromethane or trichlorofluoromethane and other Freons, for example.

The pesticides of the present invention can also be applied with nematocidal, fungicidal, bactericidal and herbicidal adjuvants or carriers such as talc, pyrophyllite, synthetic fine silica, attapulgus clay, kieselguhr, chalk, diatomaceous earth, lime, calcium carbonate, bentonite, Fuller's earth, cottonseed hulls, wheat flour, soybean flour, pumice, tripoli, wood flour, walnut shell flour, redwood flour and lignin.

It is frequently desirable to incorporate a surface active agent in the pesticidal compositions of the present invention. Such surface active or wetting agents are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkylebenzene sulfonates having 10 to 18 carbon atoms in the alkyl group, alkylphenol ethylene oxide condensation products, e.g., p-isooctylphenol condensed with 10 ethylene oxide units, soaps, e.g., sodium stearate and potassium oleate, sodium salt of propylnaphthalene sulfonic acid, (di-2-ethylhexyl) ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, octadecyl trimethyl ammonium chloride, polyethylene glycol lauryl ether, polyethylene esters of fatty acids and rosin acids, e.g., Ethofat 7 and 13, sodium N-methyl-N-oleyltaurate, Turkey red oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxidepropylene oxide condensation products, e.g., Pluronic 61 (molecular weight 1000), sorbitan sesquioleate, polyethylene glycol ester of tall oil acids, sodium octyl phenoxyethoxyethyl sulfate, tris (polyoxyethylene) sorbitan monostearate (Tween 60), sodium dihexyl sulfosuccinate.

The solid and liquid formulations can be prepared by any of the conventional procedures. Thus, the active ingredient can be mixed with the solid carrier in finely divided form in amounts small enough to preserve the free-flowing property of the final dust composition.

They can be employed against saprophytic nematodes, e.g., Panagrellus and Rhabditis or parasitic nematodes, e.g. Meloidogyne spp.

As fungicides they can be used for example against Pythium spp., Rhizoctonia, Fusarium, Helminthosporium and *Stemphyllium sarcinaeformae.*

As bactericides they are especially useful against Gram positive bacteria such as *Aspergillus niger,* anthrax bacillus and pneumococcus.

They can also be used to kill plants such as dandelions, plantain, radishes and rye grass by using larger amounts of the compounds.

When the compounds are applied to the soil to kill nematode or fungi they can be used in an amount of 0.1 to 30 lbs./acre. They can be used to kill weeds at a rate of 5 to 30 lbs./acre.

The compounds can be used against nematodes, bacteria and fungi in dosages of 50 to 500 p.p.m. In some cases they can be employed at lower dosages, e.g., 25 p.p.m., 12.5 p.p.m., 6 p.p.m. or even 1 p.p.m.

The effiicacy of hexabutyl distannane as a bacteriostat in a polyvinyl chloride plastisol was determined at 0.5% by weight of the plastisol as shown below:

HEXABUTYL DISTANNANE

Conc. _____percent__ 0.5
Zone of inhibition against *S. Aureus* _____mm__ 13

What is claimed is:
1. A process of preparing a hexaorgano-distannane comprising heating to reaction temperature reactants consisting essentially of (1) a compound having the formula $R_1R_2R_3SnCl$ and a compound having the formula

$$R_4R_5R_6SnCl$$

where $R_1$, $R_2$, $R_3$, $R_4$, $R_5$ and $R_6$ are selected from the group consisting of alkyl, aryl and aralkyl where the compounds $R_1R_2R_3SnCl$ and $R_4R_5R_6SnCl$ can be identical with the proviso that not more than three of $R_1$, $R_2$, $R_3$, $R_4$, $R_5$ and $R_6$ are aryl and (2) sodium in a tetrahydrocarbontin compound of the formula

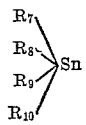

as a solvent, $R_7$, $R_8$, $R_9$ and $R_{10}$ being selected from the group consisting of alkyl and aryl.

2. A process according to claim 1 wherein there is at least 1 mole of tetraalkyltin for each mole of reactant (1).

3. A process of preparing a hexaalkyl distannane comprising heating to reaction temperature and reacting equimolar amounts of reactants consisting essentially of (1) a trialkyltin chloride and (2) sodium in a tetraalkyltin as a solvent.

4. A process according to claim 3 wherein the reaction is carried out at 80–150° C.

5. A process according to claim 4 carried out at atmospheric pressure and the tetraalkyltin is used in a molar amount at least equal to the trialkyltin chloride.

6. A process according to claim 4 wherein said trialkyltin chloride is tributyltin chloride.

7. A process according to claim 6 wherein said tetraalkyltin is tetrabutyltin.

8. A process of preparing hexabutyl distannane comprising heating at 80–150° C. at atmospheric pressure and reacting equimolar amounts of reactants consisting essentially of (1) tributyltin chloride and (2) sodium in the presence of at least one mole of a tetraalkyltin per mole of tributyltin chloride.

9. A process according to claim 8 wherein said tetraalkyltin is tetrabutyltin.

10. In a process of preparing a hexaalkyl distannane by heating a trialkyltin chloride and sodium in a solvent the improvement comprising employing without purification the trialkyltin chloride dissolved in excess tetraalkyltin employed to prepare the trialkyltin chloride from said tetraalkyltin and stannic chloride.

11. A process according to claim 10 wherein said hexaalkyl distannane is hexabutyl distannane, said trialkyltin chloride is tributyltin chloride and said tetraalkyltin is tetrabutyltin.

12. A process according to claim 3 wherein said trialkyltin chloride is a tri lower alkyltin chloride.

References Cited by the Examiner

UNITED STATES PATENTS

| | | | |
|---|---|---|---|
| 2,965,661 | 12/1960 | Ramsden | 260—429.7 |
| 3,027,393 | 3/1962 | Jenkner | 260—429.7 |
| 3,105,000 | 9/1963 | Hardy | 167—22 |
| 3,132,070 | 5/1964 | Lukes | 167—22 |

TOBIAS E. LEVOW, *Primary Examiner.*

JULIAN S. LEVITT, *Examiner.*

S. J. FRIEDMAN, W. F. BELLAMY,
*Assistant Examiners.*